May 7, 1968  H. M. RICHARDSON  3,381,704
HOSE REEL
Filed April 22, 1965
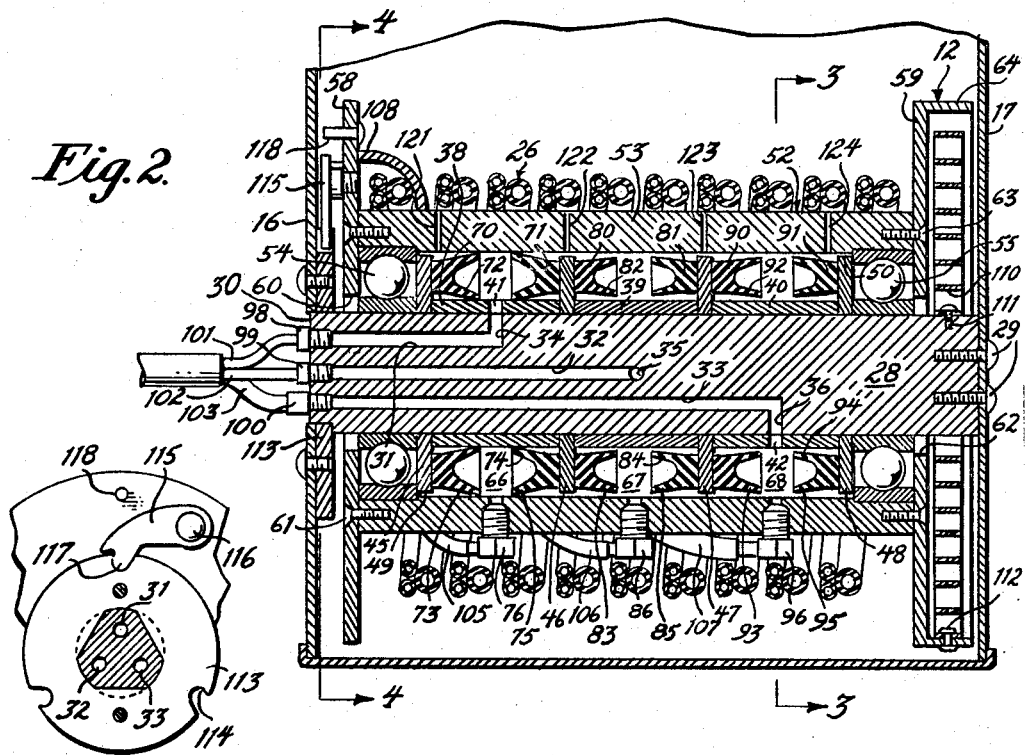
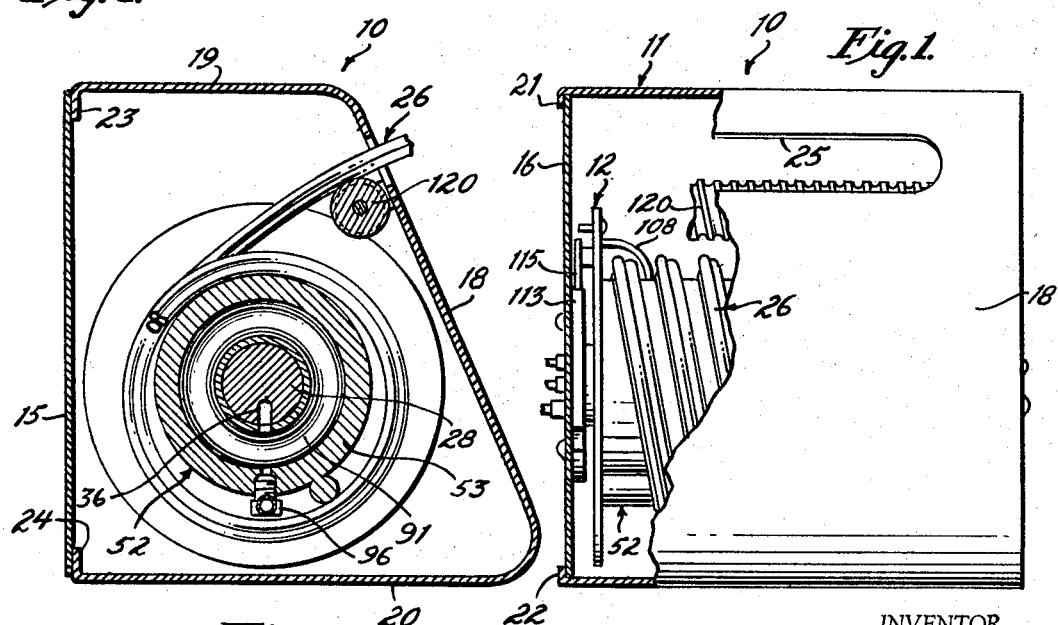
INVENTOR.
HOWARD M. RICHARDSON
BY Robert K. Youtie
ATTORNEY.

3,381,704
HOSE REEL
Howard M. Richardson, 2807 Benner St.,
Philadelphia, Pa. 19149
Filed Apr. 22, 1965, Ser. No. 450,020
9 Claims. (Cl. 137—355.17)

ABSTRACT OF THE DISCLOSURE

The instant invention is concerned essentially with a hose reel for use with plural conduits or hoses wherein a central shaft is fixed and provided with axially spaced circumferential annuli, about which a rotary spool is mounted to defined annular chambers between the spool, annuli and shaft. The shaft is provided interiorly with passageways communicating with respective chambers, and several conduits are connected through the spool for communication with respective chambers, while the chambers are provided interiorly with sealing means for sealing engagement with the interior of the spool.

---

This invention relates generally to hose reels, and is especially concerned with a unique construction of hose reel for plural-conduit hose.

While the device of the present invention has been primarily developed for use in the dental-equipment field in the powering of air drills, and will be illustrated and described hereinafter with particular reference thereto, it is appreciated that the instant reel construction is capable of many varied applications, all of which are intended to be comprehended herein.

It is an important object of the present invention to provide a hose reel of the type described wherein a plurality of separate sources of fluid under pressure may be connected to separate conduits of a hose, and wherein the conduits may be coiled and uncoiled with respect to the reel for added convenience in use, economy of space and neatness of appearance in storage, and for added safety both in use and storage.

It is a further object of the present invention to provide a plural-conduit hose-reel structure which is extremely simple in construction, requiring a minimum of relatively simple components which may be quickly assembled for economy in manufacture, It is a further object of the present invention to provide a hose-reel construction for plural-conduit hose which is foolproof in operation, and which is durable and reliable throughout a long useful life.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawing:

FIGURE 1 is a front elevational view showing a hose-reel assembly of the present invention, partly broken away for clarity of illustration;

FIGURE 2 is a longitudinal cross-sectional view of the instant hose-reel construction;

FIGURE 3 is a transverse sectional view taken generally along the line 3—3 of FIGURE 2; and FIGURE 4 is a fragmentary sectional view taken generally along the line 4—4 of FIGURE 2.

Referring now more particularly to the drawings, and specifically to FIGURES 1-3 thereof, the hose-reel assembly is there generally designated 10, and includes an outer casing 11 and a hose reel 12 rotatably mounted within the casing.

The casing 11 may be carried by any suitable support (not shown), and may include an upstanding back wall 15 and forwardly extending end walls 16 and 17 projecting in spaced relation from opposite ends of the back wall. A front wall 18 may extend across the forward edges of end walls 16 and 17, in the illustrated rearwardly inclined relation or otherwise, if desired. A top wall 19 extends rearwardly from the top of front wall 18 to the back wall 15, and a bottom wall 20 extends rearwardly from the lower end of front wall 18 to the back wall 15. The front, top and bottom walls 18, 19 and 20 may be provided with suitable flanges, as at 21, 22, 23 and 24 for securement to the back and end walls 15-17. In addition, the front wall 18 may be formed in an upper region thereof with a laterally extending, elongate slot 25 for passage therethrough of a hose 26, as will appear more fully hereinafter.

The reel 12 interiorly of the casing 11 includes a laterally extending, generally cylindrical fixed shaft or rod 28. The rod or shaft 28 may have one end fixedly secured in facing engagement with the casing end wall 17, as by fasteners 29, and the other end 30 of shaft 28 may be fixed to and open through the casing end wall 16. Extending longitudinally inward through shaft end 30, there are formed in the shaft a plurality of separate bores or passageways 31, 32 and 33, which may be located in the circular array about the shaft axis. The bores or passageways 31, 32 and 33 extend longitudinally inward of the shaft 28 from the shaft end 30 and each terminate at a different distance from the latter shaft end. More particularly, the passageway 31 terminates proximate to the shaft end 30 in a transverse bore or radial extension 34, the passageway 32 terminating in a transverse bore or radial extension 35 spaced longitudinally inward from the extension 34, and the passageway 33 terminating in a radial bore or passageway extension 36 remote from the shaft end 30. The passageway extensions 34, 35 and 36 each open radially outward through the cylindrical surface of the shaft 28, being spaced from each other longitudinally along the shaft.

Fixedly circumposed closely about the shaft 28, spaced longitudinally therealong, are a plurality of generally cylindrical sleeves 38, 39 and 40. The sleeves 38-40 may be force-fed or otherwise fixedly circumposed about the shaft 28, and each is provided with a thru opening or bore in registry with the adjacent internal passageway extension of the shaft. More specifically, the fixed sleeve 38 is formed with a thru opening 41 in registry with the passageway extension 34, and the fixed sleeve 40 is formed with a thru opening 42 in registry with the passageway extension 36. The sleeve 39 is similarly formed with a thru opening (obscured in the drawing) in registry with the radial passageway extension 35. Thus, the passageways 31-33 open radially outwardly from the interior of shaft 28.

Also fixedly circumposed about the shaft 28 are a plurality of annular collars or washers 45, 46, 47 and 48. The collars or annuli 45-48 each extend circumferentially about the shaft 28 in fixed relation thereto, being spaced longitudinally therealong, and project radially from the shaft beyond the sleeves 38-40. Further, the collars or annuli 45 and 46 are located proximate to adjacent ends of the sleeve 38, the latter collar being interposed between sleeves 38 and 39. Similarly, the collars or annuli 47 and 48 are located on opposite sides of the sleeve 40, the former collar being interposed between the sleeves 39 and 40. Thus, the annuli or collars 46 and 47 are interposed between adjacent pairs of sleeves 38-40, while the collars 45 and 48 are located at opposite ends of the series of sleeves. The end collars 45 and 48 may be slightly recessed or cut away, as at 49 and 50 respectively, on their outer sides adjacent to their outer circumferential edges.

A spool is generally designated 52 and includes a generally cylindrical hollow tube or barrel 53 spacedly circumposed about the shaft 28 and its projecting annuli or collars 45–48. The spool barrel 53 extends longitudinally beyond the outer collars 45 and 48 and is there mounted for generally axial rotation about the axis of shaft 28 by suitable journal means, such as ball bearings 54 and 55. The inner races of ball bearings 54 and 55 may be fixedly secured about the shaft 28 against the outer sides of collars 45 and 48, respectively, the outer bearing races being afforded clearance for free rotation by the recesses 49 and 50. The spool barrel 53 is mounted on the outer bearing races for free axial rotation, and is provided at its opposite ends with generally circular end plates or discs 58 and 59. That is, the plates 58 and 59 define spool ends, the former being formed with a central opening 60 spacedly receiving the shaft 28 and of an internal diameter at least slightly greater than the external diameter of the inner race of bearing 54. The spool end member or plate 58 may be fixed to the end of spool barrel 53 by suitable securing means, such as fasteners 61. The spool end member 59 is similarly formed with a central thru aperture 62 spacedly receiving the shaft 28 and of a diameter at least slightly greater than the external diameter of the inner race of bearing 55. The spool end member 59 may be suitably secured to the adjacent end of spool barrel 53, as by fasteners 63, and may be provided with a flange 64 extending about its outer circumference, projecting toward and terminating short of the casing end wall 17.

It will now be appreciated that the spool barrel 53 combines with the spaces between each adjacent pair of annuli or collars 45–48 to define thereof a plurality of annular chambers 66, 67 and 68. In particular, the annular chamber 66 extends about the shaft 28 between the collars 45 and 46, while the annular chamber 67 extends about the shaft between the collars 46 and 47, and the annular chamber 68 extends about the shaft between the annular collars 47 and 48. Located in each annular chamber 66–68, adjacent to the bounding collars 45–48 of the respective chamber, are a pair of spaced annular seals to effectively seal the respective chamber, as will appear more fully hereinafter. That is, in chamber 66 a pair of annular seals 70 and 71 are located in spaced relation to extend respectively along collars 45 and 46. The seals 70 and 71 may be substantially identical and each integrally fabricated of suitable flexible, resilient material, such as rubber, neoprene, or the like. Each of the seals 70 and 71 are generally U-shaped in cross section, arranged with its bight portion proximate to the respective collar 45, 46 and having a pair of inner and outer circumferentially extending lips projecting toward and terminating short of the lips of the other seal within the same chamber. Thus, the seal 70 includes a pair of inner and outer resiiliently flexible, circumferentially extending lips 72 and 73, respectively extending along the sleeve 38 and inner surface of spool barrel 53. The seal 71 similarly includes a pair of circumferentialy extending inner and outer, flexible resilient lips 74 and 75, respectively extending along the outer surface of sleeve 38 and inner surface of barrel 53. The lips 72 and 73 project longitudinally of the shaft 28 toward and terminate short of respective lips 74 and 75 to leave a space therebetween. A tube connector 76 extends radially inward through the barrel 53 for communication with the chamber 66 between the spaced lips 73 and 75, for a purpose appearing presently.

Interiorly of the annular chamber 76 there are located a pair of annular sealing means 80 and 81, which may be substantially identical to the sealing means 70 and 71, being integrally fabricated of suitable flexible, resilient material and of generally U-shaped configuration in cross section. The sealing means 80 thus includes circumferentially extending, inner and outer resiliently flexible lips 82 and 83 respectively engageable with the outer surface of sleeve 39 and inner surface of barrel 53, while the seal 81 similarly includes a pair of circumferentially extending inner and outer lips 84 and 85 respectively engageable with the outer surface of sleeve 39 and inner surface of barrel 53. The lips 82 and 83 respectively project longitudinally of the shaft 28 toward and terminating short of lips 84 and 85, and a tube connector 86 projects radially inward through the barrel 53 for communication with the interior of chamber 67 between the seals 80 and 81.

Similarly in chamber 68, there are provided a pair of annular seals 90 and 91 spaced longitudinally of the shaft 28, which seals are of similar construction to the seals 70, 71, 80 and 81. The seal 90 includes inner and outer circumferentially extending resiliently flexible lips 92 and 93 respectively engageable with the outer surface of sleeve 40 and inner surface of barrel 53, while the seal 91 includes inner and outer circumferentially extending lips 94 and 95 respectively engageable with the outer surface of sleeve 40 and inner surface of barrel 53. The lips 92 and 93 project longitudinally of the shaft 28 toward and terminate short of respective lips 94 and 95, and a tube connector 96 extends radially inwardly through the barrel 53 for communication with the interior of chamber 68 between the seals 90 and 91. Further, the several passageways 31, 32 and 33 have their extensions 34, 35 and 36 respectively communicating with the interiors of chambers 66, 67 and 68 between the pairs of seals in the particular chambers.

In the illustrated embodiment of FIGURE 2 there is no fluid pressure in the chambers 66–68, and the seals 70, 71, 80, 81, 90 and 91 are therefore in the relaxed or undistended condition. In the particular application of a hose reel for a dental drilling tool the seals of one chamber may engage the inner surface of spool barrel 53 in the relaxed- or undistended-seal condition, while the seals of the other chambers may be slightly spaced from the inner surface of the spool barrel when relaxed. Thus, as illustrated, the lips 73 and 75 in the relaxed condition are in engagement with the inner surface of barrel 53, while the lips 83, 85, 93 and 95 are slightly spaced from the inner barrel surface. This relaxed engagement or spacing of sealing lips with respect to the inner barrel surface may be varied according to the desired application.

A plurality of tube connectors 98, 99 and 100 are respectively secured to the shaft end 30 in communication with passageways 31, 32 and 33, and further connected to supply conduits 101, 102 and 103. In use with a dental drilling tool, the supply conduit 101 may be connected to a source of water under pressure, and the supply conduits 102 and 103 connected to a source of air under pressure. Thus, the chamber 66 is adapted to receive water under pressure, while the chambers 67 and 68 are adapted to receive air under pressure. A plural-tube conduit 26 is illustrated as including tubes 105, 106 and 107 respectively individually connected to tube connectors 76, 86 and 96. Thus, the conduit 105 is adapted to pass water, while the conduits 106 and 107 are adapted to pass air. From the tube connectors 76, 86 and 96, the separate tubes 105, 106 and 107 are connected together, as by heat-sealing or other suitable means to form the plural-tube conduit 26, which passes through a holding member or clip 108 to anchor the inner end of the conduit 26 to the barrel 53, without undue stress on the tube connectors 76, 86 and 96. The hold-down member or clip 108 may extend between the spool end member 58 and adjacent portion of barrel 53, being detachably secured in position, if desired. After extension of conduit 26 through hold-down member 108, the conduit may be coiled about the barrel 53. The conduit may then extend outward through the casing slot 25 for connection to the drilling tool. In particular, the tube 107 may be connected to the pneumatic drill, the tube 106 being connected to the air-chip blower, and the tube 105 being connected to the water nozzle.

Outward of the spool end member 59 and circumposed about the shaft 28 may be a coiled retraction spring 110. The spring may have its inner end anchored, as by fastener 111 to the shaft 28 and may have its outer end anchored, as by fastener 112 to the flange 64, and applies tension to the spool 12 in a direction of rotation tending to coil the conduit 26 and retract the same.

Fixed to wall 16, circumposed about the adjacent portion of shaft 28, is an annular catch member or washer 113 formed circumferentially with a plurality of spaced notches 114. A pawl or dog 115 is pivoted at one end, as by pin 116 to the spool end member 58 and is provided on its other end with a projection 117 engageable in a selected one of the notches 114 to resist coiling action of the spring 110 upon the spool 12. The pawl 115 is single-acting in that it permits unwinding movement of the spool 12 but holds against winding movement thereof. Thus, the conduit 26 may be withdrawn and the spool unwound to a selected extent and the pawl 15 automatically engages with the catch 113 to hold the spool in its selected position of rotation. However, upon slight additional withdrawal of conduit 26 the pawl 115 is disengaged from a receiving notch 114, and upon rapid rewinding of the conduit under the action of spring 110, the pawl is centrifugally moved outward against a stop 118 to permit free-coiling rotation of the spool to the required extent. If desired, torsion-spring means may be employed with the pawl 115 to insure holding engagement thereof with catch 113 in any selected position of the catch with the rotating spool.

In order to reduce friction of the conduit 26 passing through the slot 25 there may be provided in the casing 11 a freely rotatable roller 120 in supporting engagement with the conduit. Further, the roller may be provided with thread formations for receiving the conduit and effecting level winding of the latter on the spool.

If desired, the spool barrel 53 may be provided with lubrication openings, such as the radial holes 121, 122, 123 and 124. It will be apparent that the lubrication holes 121 and 124 are respectively located proximate to seals 70 and 91 for applying lubricant directly thereto, while the lubricating holes 122 and 123 are located opposite shoulders 46 and 47 for applying lubricant for distribution to seals 71, 80, 81 and 90.

When the instant reel assembly 10 is associated with dental-drilling apparatus, the hose or conduit 26 is extended to the desired length and the spool 12 thereby rotated, all before air or water pressure is applied. Thus, the spool is rotated with the seals 70, 71, 80, 81, 90 and 91 in their relaxed condition, the lips 83, 85, 93 and 95 being slightly spaced from the spool barrel, and the lips 73 and 75 just touching the spool barrel. Hence, there is a minimum of friction and wear. Similarly upon rewinding of the conduit 26, water and air pressure has been removed to minimize friction and wear. However, as residual water will remain in the chamber 66, it may be desirable that the sealing lips 73 and 75 at all times engage the barrel 53 to prevent possible leakage. During operation of the drilling equipment, fluid pressure applied internally to the chambers 66, 67 and 68 effects distention or deflection of the lips 73, 75, 83, 85, 93 and 95 firmly against the interior surface of the barrel 53 to effectively seal the respective chambers. As the spool 12 is immobile during this pressurization of the chambers, there is no appreciable wear of the seals.

From the foregoing, it is seen that the present invention provides a hose reel which fully accomplishes its intended objects and is well adapted to meet practical conditions of manufacture, maintenance and use.

Although the present invention has been described in some detail by way of illustration and example for purposes of clarity of understanding, it is understood that certain changes and modifications may be made within the spirit of the invention and scope of the appended claims.

What is claimed is:

1. A hose reel comprising a fixed shaft, at least three axially spaced annuli extending about said shaft in fixed relation thereto, a rotary spool circumposed about said annuli and combining with the latter and said shaft to define a plurality of annular chambers, journal means on said shaft mounting said spool for generally axial rotation about the axis of said shaft, annular sealing means in said chambers for sealing against the interior of said rotary spool, said shaft being formed with a plurality of inlet passages each communicating with a respective chamber, a plurality of tube connections carried by said spool and each communicating through said spool into a respective chamber, and plural-conduit hose means coiled about said spool and having its conduits respectively connected to said tubular connections.

2. A hose reel according to claim 1, said sealing means including flexible circumferential lips for sealing engagement with said spool.

3. A hose reel according to claim 2, said spool being provided with lubricating openings communicating with said lips.

4. A hose reel according to claim 1, said annuli projecting radially from said shaft, and said sealing means comprising a pair of rings in spaced relation in each of said chambers on opposite sides of the associated tube connection, and a resiliently flexible radially outer circumferential lip on each ring for sealing engagement with the adjacent internal surface of said spool.

5. A hose reel according to claim 4, in combination with resilient means connected between said shaft and spool to yieldably urge the latter in a hose-retracting direction of its rotative movement, and catch means connected to said spool and shaft for releasably retaining the spool in a selected position of its rotative movement against the action of said resilient means.

6. A hose reel comprising a fixed shaft, at least three axially spaced annular shoulders projecting radially from and extending circumferentially about said shaft, a rotary spool circumposed about said shoulders radially spaced from said shaft and combining with said shaft and shoulers to define in the space therebetween a plurality of annular chambers, journal means on said shaft mounting said spool for generally axial rotation about the axis of said shaft, a pair of spaced annular seals extending circumferentially within each chamber, a radially outer resiliently flexible circumferential lip on each seal extending toward and terminating short of the lip of the other seal in the same chamber for sealing engagement with the interior of said spool, said shaft being formed with a plurality of separate inlet passageways each communciating with a respective chamber, a plurality of tube connections carried by said spool and each communicating through said spool into a respective chamber between the seal lips therein, and plural-conduit hose means coiled about said spool and having its conduits respectively connected to said tube connections.

7. A hose reel according to claim 6, said inlet passages extending inwardly longitudinally through said shaft and thence generally radially into respective chambers.

8. A hose reel according to claim 6, said lips being resiliently deflectable under internal chamber pressure for effective sealing action.

9. A hose reel according to claim 6, at least certain of said lips being spaced from said spool in the absence of internal chamber pressure and being in engagement with said spool under the force of internal chamber pressure.

References Cited

UNITED STATES PATENTS 1,206,563   11/1916   McConnell _____ 137—355.23
2,310,309   2/1943    Orr _____ 137—580

(Other references on following page)

UNITED STATES PATENTS

| | | | |
|---|---|---|---|
| 2,458,343 | 1/1949 | Carleton | 285—190 X |
| 2,478,540 | 8/1949 | Martin | 137—355.17 X |
| 2,629,630 | 2/1953 | Roark | 137—355.23 X |
| 2,640,724 | 6/1953 | Sanders et al. | 137—355.17 X |
| 2,768,843 | 10/1956 | Zeilman | 285—190 X |
| 2,783,089 | 2/1957 | Prout | 137—355.17 |
| 2,823,074 | 2/1958 | Bernard | 137—355.17 |
| 3,181,898 | 5/1965 | Brown | 285—190 X |
| 3,186,723 | 6/1965 | Wagner | 277—59 |

FOREIGN PATENTS

| | | |
|---|---|---|
| 333,339 | 8/1930 | Great Britain. |

M. CARY NELSON, *Primary Examiner.*

S. SCOTT, *Assistant Examiner.*